Figure 1:
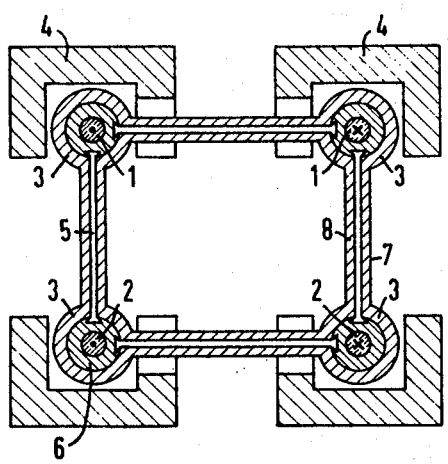

United States Patent Office 3,391,288
Patented July 2, 1968

3,391,288
SUPPORTING DEVICE FOR A SUPER-
CONDUCTIVE WINDING
Wilhelm Kafka, Tennenlohe, Germany, assignor to Siemens Aktiengesellschaft, Erlangen, Germany, a corporation of Germany
Filed Oct. 19, 1965, Ser. No. 497,646
Claims priority, application Germany, Jan. 27, 1965, S 95,178
11 Claims. (Cl. 310—11)

My invention relates to superconductive devices. More particularly, it relates to improved mounting and supporting structures for superconductive windings which are characterized by advantageous low heat loss characteristics.

Since superconductive windings are operated at extremely low temperatures, they have to be well heat-insulated from their surroundings. To achieve such heat insulating, a known technique has been to provide hollow evacuated double jackets which are filled with reflecting wrinkled foils. Such insulation is capable of transmitting only relatively weak forces in the transverse direction. However, superconductive windings, upon their excitation to great magnetic field intensities, produce quite strong forces. If these forces are to be transmitted transversely to external supports through the heat insulation, the transmitting members have to be of such nature that, perforce, they have to deleteriously effect the heat insulation.

Accordingly, it is an important object of this invention to provide a supporting device for a superconductive winding wherein heat loss is substantially minimized.

This object is achieved by providing an arrangement in which the magnetic forces exerted by some of the parts of the winding on other parts of the winding are compensated for by magnetic forces produced between winding parts and bodies comprising a magnetic material or, alternatively, the forces between winding parts are modified to the extent that only repulsive forces remain between all of the winding parts and such latter forces are taken up by tensioning anchors such as tie rods and pull rods which are affixed to supports of the winding.

With such arrangement, soft- or hard-magnetic structures are so disposed in the areas surrounding the winding parts that the attractive forces between the latter are either substantially reduced to zero or are converted to smaller, and repulsive forces, such effects resulting from the attractive forces created between the individual winding parts and the stationary iron, i.e., magnetic, tensioning anchors. If the forces between adjacent parts of the winding are mutually repulsive but quite strong, it is possible to arrange the aforesaid magnetic anchors which are solidly affixed whereby the repulsion between the parts of the winding is reduced to a small value whereby fewer and lighter tensioning anchor members (such as pull rods) are sufficient. For bracing, there may suitably be used nylon threads or wires made of a non-magnetic material, or stainless steel. The bracing structures are preferably enclosed in a heat-insulating housing to prevent their transmitting of relatively large amounts of heat from the exterior to the winding.

Generally speaking and in accordance with the invention, there is provided in combination with a superconductive winding comprising a plurality of coils in which each of the coils is enveloped in a solid metallic casing, a support for the winding. The latter support comprises a fixed magnetic structure adjacent each of the coils whereby the magnetic attraction between the coils and the fixed magnetic structures compensate for the magnetic forces between the coils. There are further provided respective tie rods connected between adjacent coils for taking up residual magnetic repulsion forces remaining between the coils, the tie rods extending between the casings of the respective coils.

The foregoing and more specific objects and features of my invention will be apparent from, and will be mentioned in the following description of a supporting device for a superconductive winding shown by way of example in the accompanying drawing.

Figure 2:
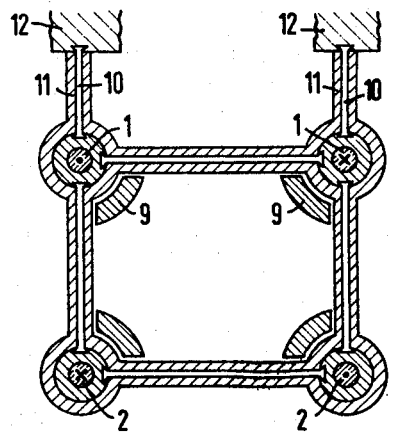
Figure 3:
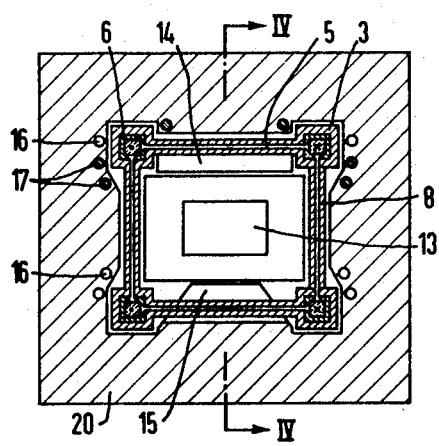
Figure 4:
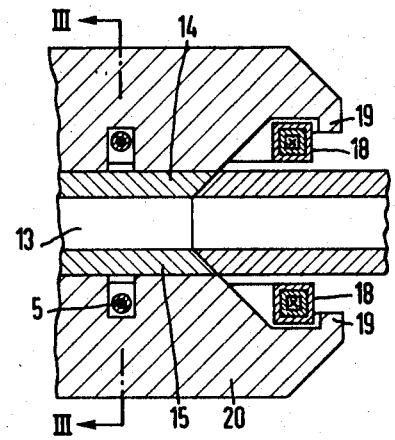

In the drawing,
FIG. 1 is a view in cross-section of an illustrative embodiment of a supporting device for a superconductive winding constructed in accordance with the principles of the invention;
FIG. 2 is a view similar to FIG. 1 of another embodiment;
FIG. 3 is a view taken along lines III—III looking in the direction of the arrows of FIG. 4 of a magnetohydrodynamic generator utilizing a supporting device constructed according to the invention; and
FIG. 4 is a view taken along lines IV—IV of FIG. 3, looking in the direction of the arrows.

Referring now to FIG. 1, there is shown therein a support structure for a superconductive winding which comprises two planar rectangular coils 1 and 2 which are traversed by current therethrough in the same horizontal direction. Two such coils tend to greatly attract each other and consequently normally have to be braced against each other by strong spacing members. However such bracing is not possible through heat insulation 3 which comprises a wrinkled foil. Consequently, the spacing members either have to touch the windings and pass through the heat insulation, or have to be, themselves, heat-insulated. Such a situation not only results in a complex heat insulating arrangement but also a relatively large amount of heat penetration which in turn requires commensurately large amounts of cooling agents during continuous operation of the winding. In the structure depicted in FIG. 1, U-shaped beams 4 comprised of iron, suitably cobalt-iron, surround the coils. These beams are suitably braced against each other to form a rigid scaffolding, and they alter the magnetic forces exerted upon the parts of the winding such that, instead of there occurring a strong attraction between coils 1 and 2, there occurs therebetween only a slight repulsion. The respective parts of each coil are pulled into the iron beams and may then be rigidly maintained by tensioning anchors such as tie rods 5 which are suitably provided at several points along the winding. As long as the coils are not excited, the weight of the winding bears against the external boundary of the heat insulation through the heat insulation. The bearing pressure is quite small so that it may be repeatedly exerted without harm to the structure. Otherwise, the weight of the windings has to be distributed by means of special tensioning anchors, i.e., tie rods, as are shown in FIG. 2. If the coils are excited, the weights of the winding may be compensated for to a great extent by the asymmetrical magnetic forces which occur between the winding and the beam. If wrinkled foil is employed as the heat insulating material, the heat insulation will again increase again to its original good value without the transfer of forces.

It is seen in the structure of FIG. 1 that the tensioning anchors, i.e., tie rods 5, do not physically directly touch the windings but rather make contact with a metallic envelope or support 6 around the winding. Ducts for the cooling liquid may suitably be provided within envelope 6. Alternatively, cooling may be effected through the employment of cooling ducts which are wound around envelope 6. Since envelope 6 and, consequently, the locations where the tensioning anchors are disposed are at approximately the same temperature as that of the superconductive winding, these tensioning anchors, i.e., tie rods, are suitably accommodated in evacuated metal jackets 7, which are filled with wrinkled metal foil which functions as the heat insulating material.

Instead of using U-shaped iron beams which suitably comprise a soft, i.e., high permeability metal material, there may be used soft magnetic material members having other configurations. Thus, for example, there may be employed a rod or plate or several rods or plates respectively or the parts of the winding may be disposed in massive yokes which also enclose the magnetic flux exterior to the utilized space and, thus, prevent the diffusion of the magnetic field into the ambient surroundings to thereby lessen the requirements for superconductive current circulation, i.e., the requirements of electric excitation.

In FIG. 2, there is shown a winding for producing a four-pole field. In this winding, the magnetic attraction between the soft magnetic material stationary members 9 suitably consisting of cobalt-iron and the parts of the winding is utilized to compensate for the magnetic repulsive forces between the four winding parts to the extent that only a relatively minor repulsion remains between these parts, this latter repulsion being essentially absorbed by a few tensioning anchors, i.e., tie rods. Suspension members are provided at the four winding part locations of the upper winding to enable the carrying thereby of the weight of all four winding parts. The suspension members comprise tensioning anchors, i.e., tie rods 10 disposed in evacuated metallic housings 11. The tensioning anchors are mounted in an external support scaffold 12. Because of the mounting of the tensioning anchors in scaffold 12, their heat conductivity should be poor. These tensioning anchors may be replaced by nylon thread members.

FIGS. 3 and 4 respectively show two cross sections of a magneto-hydrodynamic-generator with a complete magnetic circuit. The magneto-hydrodynamic duct 13 therein is located between a pair of pole shoes 14 and 15 which are respectively of different configurations in order to ensure a magnetic pull in the upward direction and, thereby, to compensate to a large extent for the weight of the windings. The balancing of magnetic forces may be facilitated with the use of holes 16 in the magnetic iron body 20. If desired or if it is necessary, some of holes 16 can be filled with iron rods 17. Holes 16 function to effect a change in the magnetic saturation of the iron and, consequently, the stray lines of force which bring about the magnetic forces on the windings. In order to prevent the occurrence of attractive forces between the parts of the windings on the front faces 18 of the winding parts as shown in FIG. 4, the iron yokes 19 protrude to partially encompass front faces 18. The iron parts of magnetic body 20 are carefully equalized, i.e., balanced whereby the front side connectors are effectively not subjected either to any magnetic attraction or to any magnetic repulsion. Consequently, the use of tensioning members, i.e., tie rods, on the front sides are rendered unnecessary.

The windings enveloped in their solid casings 6, as well as the tensioning anchors 5 are embedded together in the wrinkled foil heat insulation 8. The evacuated space is completely soldered or welded together. The electric leads to the superconductive winding and the feed lines for helium and nitrogen, if it is needed, are introduced into the heat insulation through known sealed means which are required at such low temperatures. Iron magnetic body 20 is suitably comprised of plates. The magneto-hydrodynamic canal 13 with its power and water supply lines is fabricated separately from the magnetic body and, thereafter, is inserted lengthwise thereinto. For the latter purpose, a slideway or roller-type conveyor may be used.

It will be obvious to those skilled in the art upon studying this disclosure that supporting devices for a superconductive winding according to my invention permit of a great variety of modifications and hence can be given embodiments other than those particularly illustrated and described herein without departing from the essential features of my invention and within the scope of the claims annexed hereto.

I claim:
1. In combination with a superconductive winding comprising a plurality of coils, each of said coils being enveloped in a solid metallic casing: a support for said winding comprising a fixed magnetic structure adjacent each of said coils whereby the magnetic attraction between said coils and said fixed magnetic structures compensate for the magnetic forces between said coils, and respective tie rods connected between adjacent coils for taking up residual magnetic repulsion forces remaining between said coils, said tie rods extending between the casings of the respective coils.

2. In the combination defined in claim 1 wherein said magnetic structure comprise cobalt-iron.

3. In the combination defined in claim 1 wherein each of said magnetic structures is a U-shaped member and wherein the coils are respectively received within the space defined by the legs of said members.

4. In the combination defined in claim 1 wherein each of said magnetic structures is a circular segment concentrically disposed with the casing of a coil and disposed at the angle made by the tie rods extending from said casing.

5. In the combination defined in claim 1 wherein said tie rods and said casings are contained in evacuated jackets which contain therein wrinkled metal foil.

6. In the combination defined in claim 5 wherein each of said magnetic structures is a circular segment concentrically disposed with the casing of a coil and disposed at the angle made by the tie rods extending from said casing and further including an external support scaffold and further tie rods connected from some of said coils to said scaffold.

7. In the combination defined in claim 6 wherein said further tie rods are comprised of nylon.

8. In a magneto-hydrodynamic generator, a super-conductive winding comprising two coils defining in cross section respective corners of a rectangle, a metallic casing around each of said coils, tie rods connected between the casings of adjacent coils to define said rectangle, an evacuated jacket surrounding said coils and said tie rods, said jacket containing wrinkled foil, a magneto-hydrodynamic canal extending through the inner space of said rectangle, a pair of opposed magnetic pole shoes on a pair of opposite horizontally disposed tie rods, each of said pole shoes being adjacent and spaced from a side of said canal, and a magnetic material body surrounding said superconductive winding.

9. In a magneto-hydrodynamic generator as defined in claim 8 wherein said surrounding magnetic material body contains holes therein for balancing magnetic forces.

10. In a magneto-hydrodynamic generator as defined in claim 8 wherein some of said holes are filled with magnetic material rods.

11. In a magneto-hydrodynamic generator as defined in claim 8 wherein an upper of said pole shoes is larger and of a different design than the lower of said pole shoes to produce a net magnetic pull in the upward direction.

References Cited
UNITED STATES PATENTS 3,242,418    3/1966    Mela et al. _____ 322—28

DAVID X. SLINEY, *Primary Examiner.*